United States Patent
Lee et al.

(10) Patent No.: US 10,217,551 B2
(45) Date of Patent: Feb. 26, 2019

(54) MAGNETIC SHEET, METHOD OF MAKING THE SAME, AND LOUD SPEAKER INCLUDING THE SAME

(71) Applicants: SAMSUNG ELECTRONICS CO., LTD., Suwon-si, Gyeonggi-do (KR); Research & Business Foundation SUNGKYUNKWAN UNIVERSITY, Suwon-si, Gyeonggi-do (KR)

(72) Inventors: Sang-Eui Lee, Hwaseong-si (KR); Byungkwon Lim, Seoul (KR); Kyoung-Seok Moon, Hwaseong-si (KR); In Taek Han, Seoul (KR); Jin Kyu Kang, Hwaseong-si (KR); Jin Ho Ahn, Yongin-si (KR); Nayoung Kwon, Gimpo-si (KR); Shingyu Bok, Suwon-si (KR); Hwansu Sim, Jinju-si (KR); Jooyoung Lee, Suwon-si (KR); Guh-Hwan Lim, Seoul (KR)

(73) Assignees: Samsung Electronics Co., Ltd., Gyeonggi-do (KR); Research & Business Foundation Sungkyunkwan University, Gyeonggi-do (KR)

( * ) Notice: Subject to any disclaimer, the term of this patent is extended or adjusted under 35 U.S.C. 154(b) by 0 days.

(21) Appl. No.: 15/190,923

(22) Filed: Jun. 23, 2016

(65) Prior Publication Data
US 2017/0178771 A1  Jun. 22, 2017

(30) Foreign Application Priority Data
Dec. 22, 2015  (KR) ........................ 10-2015-0184029

(51) Int. Cl.
*H01F 1/00* (2006.01)
*H01F 1/053* (2006.01)
(Continued)

(52) U.S. Cl.
CPC ............... *H01F 1/053* (2013.01); *B32B 5/02* (2013.01); *H01F 41/0253* (2013.01);
(Continued)

(58) Field of Classification Search
None
See application file for complete search history.

(56) References Cited

U.S. PATENT DOCUMENTS

| | | | | |
|---|---|---|---|---|
| 4,378,250 A | * | 3/1983 | Treadway | C09D 183/06 106/287.11 |
| 5,143,583 A | * | 9/1992 | Marchessault | D21H 17/00 162/138 |

(Continued)

FOREIGN PATENT DOCUMENTS

| | | |
|---|---|---|
| JP | 2000277973 A | 10/2000 |
| KR | 101433332 | 8/2014 |
| WO | 2013119179 A1 | 8/2013 |

OTHER PUBLICATIONS

Machine Translation of JP 2000-277973 A (Year: 2000).*

*Primary Examiner* — Kevin M Bernatz
(74) *Attorney, Agent, or Firm* — Harness, Dickey & Pierce, P.L.C.

(57) ABSTRACT

A magnetic sheet having a magnetic material particle comprising a hexaferrite and a nanofiber matrix made of two or more nanofibers, wherein the magnetic material particle is dispersed in the nanofiber matrix. A manufacturing method thereof and a speaker including the magnetic sheet are also provided.

18 Claims, 7 Drawing Sheets

(51) Int. Cl.
*B32B 5/02* (2006.01)
*H01F 41/02* (2006.01)
*H04R 9/02* (2006.01)
*B82Y 30/00* (2011.01)

(52) U.S. Cl.
CPC ............ H04R 9/025 (2013.01); *B82Y 30/00* (2013.01); *H04R 2209/024* (2013.01); *Y10T 428/25* (2015.01); *Y10T 428/2982* (2015.01); *Y10T 428/32* (2015.01)

(56) References Cited

U.S. PATENT DOCUMENTS

| | | | |
|---|---|---|---|
| 8,263,224 B2 | 9/2012 | Tokiwa | |
| 8,575,045 B1 * | 11/2013 | McKnight | D06M 10/025 428/372 |
| 8,785,623 B2 * | 7/2014 | Olsson | B82Y 25/00 162/138 |
| 9,638,639 B2 * | 5/2017 | Fan | G01N 21/658 |
| 9,767,944 B2 * | 9/2017 | Galland | H01F 1/01 |
| 2003/0059609 A1 * | 3/2003 | Rodgers | D02G 3/441 428/373 |
| 2011/0039983 A1 * | 2/2011 | Kuehner | B82Y 30/00 523/466 |
| 2013/0140076 A1 | 6/2013 | Lee et al. | |
| 2016/0099498 A1 * | 4/2016 | Pance | H01F 1/0551 343/787 |
| 2016/0113113 A1 * | 4/2016 | Sethumadhavan | D06M 11/83 174/268 |
| 2016/0276072 A1 * | 9/2016 | Sethumadhavan | H01F 1/0315 |

* cited by examiner

MAGNETIC SHEET, METHOD OF MAKING THE SAME, AND LOUD SPEAKER INCLUDING THE SAME

This application claims priority to and the benefit of Korean Patent Application No. 10-2015-0184029 filed in the Korean Intellectual Property Office on Dec. 22, 2015 and all the benefits accruing therefrom under 35 U.S.C § 119, the entire contents of which are incorporated herein by reference.

BACKGROUND

1. Field

The described technology relates generally to a magnetic sheet having magnetism, a method of manufacturing thereof, and a speaker including the magnetic sheet.

2. Description of the Related Art

Magnetic materials may be divided into iron (Fe)-based magnetic materials and non-ferrous magnetic materials. Among the iron-based magnetic materials, ferrite materials have merits in terms of high chemical stability and a good raw material price such that they are widely used for a variety of purposes such as a motors, AC generators, and communication components.

Recently, due to the trend of down-sizing, weight reduction, and high efficiency in various electronic device fields, the need for a magnetic material that can be down-sized while having excellent magnetic characteristic is further increased.

The above information disclosed in this Background section is only for enhancement of understanding of the background of the described technology and therefore it may contain information that does not form the prior art that is already known in this country to a person of ordinary skill in the art.

SUMMARY

An embodiment provides a magnetic sheet having an excellent magnetic characteristic.

Another embodiment provides a speaker including the magnetic sheet.

A further embodiment provides a method for manufacturing the magnetic sheet.

According to an embodiment, a magnetic sheet including a magnetic material particle having a hexaferrite, and a nanofiber matrix made of two or more nanofibers, wherein the magnetic material particle is dispersed in the nanofiber matrix, is provided.

The magnetic material particle may include at least one of an M-type hexaferrite and a W-type hexaferrite.

The magnetic material particle may satisfy Chemical Formula 1 below.

Chemical Formula 1

In Chemical Formula 1, A is one or more elements selected from Sr, Ba, and Ca, R is one or more elements selected from the rare earth elements, M is one or more elements selected from Co, Mn, Zn, Zr, Ni, Ti, Cu, Al, Ge, and As, $0 \leq x \leq 0.6$, and $0 \leq y \leq 1.2$.

The magnetic material particle may satisfy Chemical Formula 2 below.

Chemical Formula 2

In Chemical Formula 2, A is one or more elements selected from Sr, Ba, and Ca, and Q is one or more elements selected from Cu, Zn, Mn, and Ni.

The magnetic material particle may be a hard magnetic material.

The magnetic material particle may be included in an amount of 5 wt % or more with reference to an entire weight of the magnetic sheet.

The size of the magnetic material particle may be more than 0 μm to less than or equal to 50 μm.

The diameter of the nanofiber may be in a range of 5 nm to 100 nm.

The nanofiber may include a cellulose nanofiber.

A coupling material adhering the magnetic material particle to the nanofiber may be further included.

The coupling material may be a silane-based compound including a hydrophilic group, and the coupling material may include at least an amine functional group.

The coupling material may include a silane compound, and the silane compound may include repeating units derived from a monomer represented by Chemical Formula 3 below.

Chemical Formula 3

Further, a speaker including the above-described magnetic sheet is provided.

A method for manufacturing the magnetic sheet includes synthesizing the magnetic material particle, mixing the magnetic material particle with a solution containing a nanofiber to form a nanofiber matrix, and drying the formed nanofiber matrix and the magnetic material particle.

The magnetic material particle may be synthesized by solvothermal synthesis.

The solvothermal synthesis may be performed at a temperature of 200° C. to 400° C.

The magnetic sheet manufacturing method may further include processing a coupling of the synthesized magnetic material particle.

The nanofiber matrix and the magnetic material particle may be pressed during the drying, and the nanofiber matrix and the magnetic material particle may be pressed at a pressure of 20 MPa to 80 MPa.

A magnetic sheet having excellent magnetic characteristics, reduced size, and low weight, and the method of manufacturing thereof, may be provided.

Further, as the speaker includes the magnetic sheet, the down-sizing and the weight reduction may be realized.

DETAILED DESCRIPTION

The embodiments will be described more fully hereinafter, in which exemplary embodiments of the described technologies are shown. As those skilled in the art will realize, the described embodiments may be modified in various different ways, all without departing from the spirit or scope of the described technologies.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Further, as used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

As used herein, "alkoxy" means an alkyl group that is linked via an oxygen (i.e., alkyl-O—), for example methoxy, ethoxy, and sec-butyloxy groups. "Vinyl" means an alkyl group having ethylenically unsaturated terminal group (e.g., vinyl, methvinyl, allyl, methallyl or pent-4-en-1-yl). "Acyl" means a group of the formula —C(=O)R wherein R is the alkyl, the alkoxy, the vinyl, the vinyloxy. "Carboxy group" means a group of the formula —C(=O)OR wherein R is an alkyl group."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein Hereinafter, a schematic structure of a magnetic sheet 100 according to an embodiment will be described.

Figure 1:
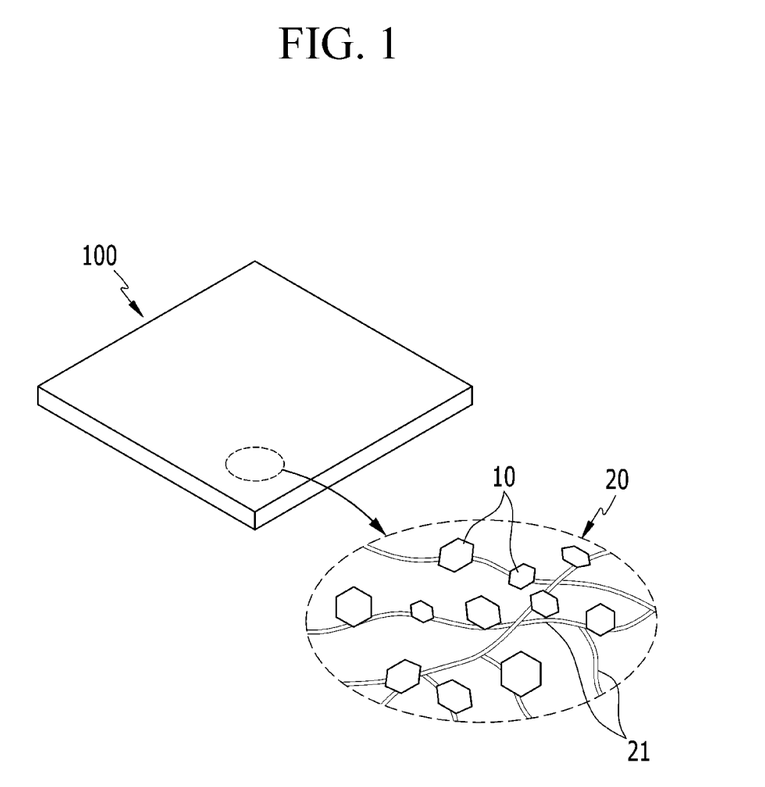
FIG. 1 is a schematic view showing a magnetic sheet according to an embodiment.

FIG. 1 is a schematic view showing a magnetic sheet according to an embodiment.

Referring to FIG. 1, the magnetic sheet 100 may be formed in a sheet shape extending on a 2-dimensional plane. The magnetic sheet 100 may be processed into a variety of shapes such as circular, oval, rectangular, or forms that have been not set.

The magnetic sheet 100 according to an embodiment includes a magnetic material particle 10 including a hexaferrite and a nanofiber matrix 20 made of two or more nanofibers 21. The magnetic material particle 10, as shown in FIG. 1, is dispersed in the nanofiber matrix 20.

The magnetic material particle 10 may be dispersed on the upper portion, the lower portion, or the side portion of the nanofiber matrix 20, or may be dispersed on, under, or inside the nanofiber matrix 20.

The hexaferrite, as shown in FIG. 1, may have a hexagonal microstructure on a plane. In the embodiment, the magnetic material particle 10 as the hexagonal hexaferrite having hard magnetism may include an M-type, a W-type, an X-type, a Z-type, a U-type, or a combination comprising at least one of the foregoing.

In an embodiment, the magnetic material particle 10 may include at least one of the M-type hexaferrite and the W-type hexaferrite.

In the embodiment, the magnetic material particle 10 may be the M-type hexaferrite represented by Chemical Formula 1 below.

$$A_{1-x}R_xFe_{12-y}M_yO_{19}$$  Chemical Formula 1

In Chemical Formula 1, A is one or more elements selected from Sr, Ba, and Ca, R is one or more elements selected from a total of 17 kinds of rare earth elements, M is one or more elements selected from Co, Mn, Zn, Zr, Ni, Ti, Cu, Al, Ge, and As, and $0 \le x \le 0.6$ and $0 \le y \le 1.2$. As used herein, a rare earth element is defined as a group of elements comprising the lanthanides, scandium, and yttrium.

Also, in an embodiment, the magnetic material particle 10 may be the W-type hexaferrite represented by Chemical Formula 2.

$$AQ_2Fe_{16}O_{27}$$  Chemical Formula 2

In Chemical Formula 2, A is one or more elements selected from Sr, Ba, and Ca, and Q is one or more elements selected from Cu, Zn, Mn, and Ni.

Meanwhile, in an embodiment, the magnetic material particle 10 may include both the M-type hexaferrite represented by Chemical Formula 1 and the W-type hexaferrite represented by Chemical Formula 2. In this case, in the magnetic material particle 10, a ratio of the M-type hexaferrite to the W-type hexaferrite may be variously controlled so as to provide the desired hard magnetism characteristic.

In an embodiment, magnetic saturation of the magnetic material particle 10 may be more than about 20 electromagnetic units per gram (emu/g), and preferably more than 27 emu/g. Further, in the embodiment, a coercive force of the magnetic material particle 10 may be, for example, more than 600 Oersted (Oe), preferably more than 700 Oe, and more preferably more than 780 Oe.

When the magnetic saturation and the coercive force of the magnetic material particle 10 simultaneously satisfy the range, the hard magnetism characteristic of the magnetic sheet 100 may be realized.

In an embodiment, the magnetic material particle 10 may be contained in an amount of 5 weight percent (wt %) or more, for example in an amount of 10 wt % or more, for example in an amount of 15 wt % or more, or, for example, at an amount of 20 wt %, with reference to the entire weight of the magnetic sheet 100. When the amount of the magnetic material particle 10 in the magnetic sheet 100 is in the aforementioned range, the magnetic sheet 100 exhibits the excellent magnetic characteristic, and the magnetic characteristic of the magnetic sheet 100 is increased to a level that is proportional to the amount of the magnetic material particle 10. The increasing trend of the magnetic characteristic according to the amount of the magnetic material particle 10 will now be described.

The size of the magnetic material particle 10 may be various, and in an embodiment, for example, the size may be less than or equal to 100 micrometers (μm), or, less than or equal to 80 μm, or, less than or equal to 50 μm. The size of the magnetic material particle 10 is defined by the diameter of a circle that circumscribes the magnetic material particle 10. When the size of the magnetic material particle 10 is within the range, the magnetic material 10 may generate the excellent magnetic characteristic as the hard magnetic material.

As shown in FIG. 1, the nanofiber matrix 20 has a structure in which two or more nanofibers 21 are intertwined with each other to form a three-dimensional mesh. That is, the nanofiber matrix 20 may be porous and include a region where the nanofibers 21 are positioned and two or more pore openings are formed between the nanofibers 21.

The nanofibers 21 may be randomly entangled, and accordingly, the formed pores may not be aligned in a predetermined direction but may be formed in random directions.

In an embodiment, the nanofiber 21 may have a diameter of several nanometers (nm) to several hundred nanometers, for example, 1 nm to 200 nm, or for example, 5 nm to 100 nm. When the nanofiber 21 has the diameter within this range, the nanofibers 21 are densely entangled thereby forming the nanofiber matrix 20.

Meanwhile, in an embodiment, the nanofiber 21 may be made of cellulose. The cellulose nanofiber may be obtained by generally known methods, for example, by processing plants, organisms such as animals or bacteria, or through various methods such as an artificial synthesis method. The method of forming the three-dimensional mesh by using the obtained cellulose nanofiber is widely known. As described above, the nanofiber matrix 20 according to the embodiment may be manufactured by using materials that may be easily obtained, thereby being effective in terms of economy of the magnetic sheet 100, a mass production possibility, etc.

Figure 2:
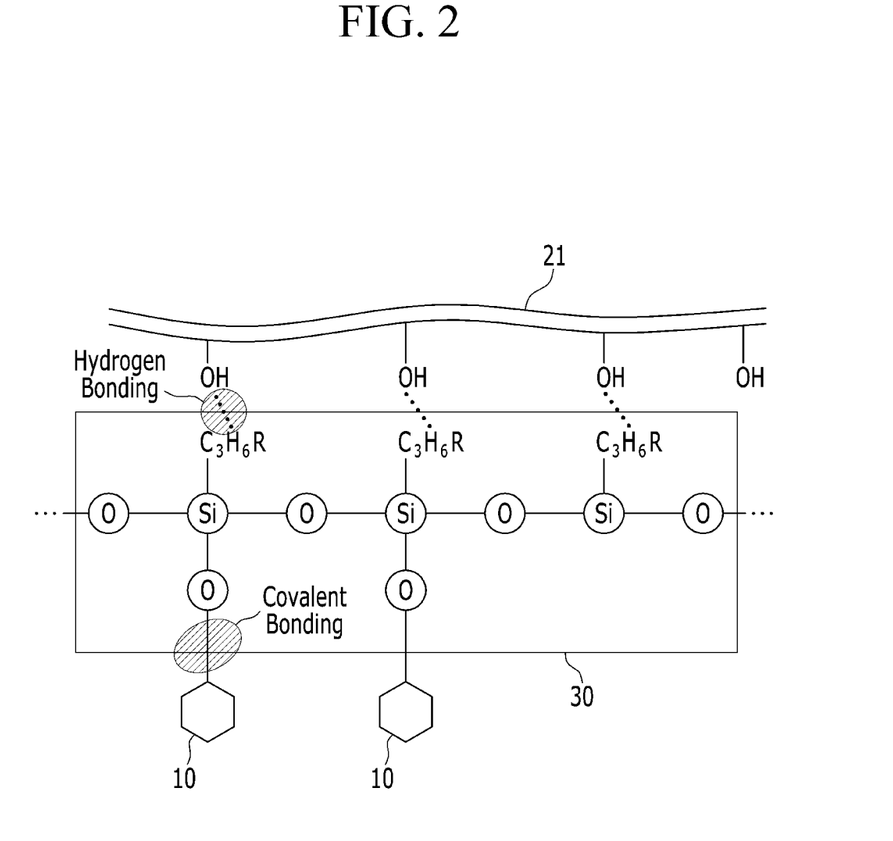
FIG. 2 is a schematic view of a chemical combination between a magnetic material particle and a nanofiber in the magnetic sheet of FIG. 1.

FIG. 2 is a schematic view of chemical combination between a magnetic material particle and a nanofiber in the magnetic sheet of FIG. 1.

Referring to FIG. 2, the magnetic sheet 100 according to an embodiment may further include a coupling material 30 chemically combining the magnetic material particle 10 to the nanofiber 21. The coupling material 30 is coupled with the magnetic material particle 10 and the nanofiber 21 by the strong chemical coupling, thereby having a function of fixing the magnetic material particle 10 to the nanofiber 21.

In an embodiment, the coupling material 30 may be a compound in which a hydrophilic group is included on a main chain or a side chain. The coupling material 30 may be a silane compound including a functional group such as at least an amine-based, an acryl-based, an epoxy-based, a mercapto-based, a chloro-based, or a vinyl-based functional group, or may be a compound of which an end without the functional group is substituted by a hydrophilic group, an alkoxy group, a carboxy group, a hydroxy group, a mercapto group, etc.

For example, the coupling material 30 may be the silane compound in which monomers represented by Chemical Formula 3 below form silane coupling (Si—O—Si), and in this case, R in FIG. 2 may be diethylenetriamine.

Chemical Formula 3

Accordingly, the coupling material 30, as shown in FIG. 2, may form a covalent bond with the magnetic material particle 10 through a methoxy group (—CH$_3$O). That is, when the magnetic material particle 10 uses an aqueous solution as a solvent, the hydroxyl group (—OH) is formed to the end of the magnetic material particles, and the hydroxyl group (—OH) is bonded with the methoxy group (—CH$_3$O), thereby forming an ether bond (—O—) while eliminating water (H$_2$O).

However, the exemplary embodiment is not limited thereto, the hydroxyl group (—OH) and/or an amine group (—NH$_2$) may be formed on one end of the coupling material 30, and the hydroxyl group (—OH) may be formed on the end of the magnetic material particle 10, thereby being a structure forming a hydrogen bonding between the coupling material 30 and the magnetic material particle 10.

Meanwhile, in the case of the cellulose nanofiber, since the hydroxyl group (—OH) is included in the end, as shown in FIG. 2, the cellulose nanofiber may form the hydrogen bond with the coupling material 30, or may be bonded with the methoxy group (—CH$_3$O), thereby forming the ether bond (—O—) while eliminating the water (H$_2$O).

In the case of a typical magnetic sheet, the magnetic material particle is physically adhered on the base material. In this case, based on the characteristic that the magnetic material particle and the base material are made of the heterogeneous material, there is a problem that a bonding force between the magnetic material particle and the base material is relatively weak, and when repeatedly applying a physical impact to the magnetic sheet, the magnetic material particle may be eliminated from the base material such that the reliability may be deteriorated.

However, the magnetic sheet 10 according to an embodiment may strongly couple the magnetic material particle 10 having the hard magnetism and the nanofiber matrix 20 through the coupling material 30 such that the magnetic material particle 10 may not be separated from the nanofiber matrix 20 even if the physical impact is repeatedly applied. That is, according to the embodiment, the magnetic sheet 100 with improved reliability for the magnetic characteristic is provided.

Hereinafter, a manufacturing method of the magnetic sheet 100 according to the embodiment will be described.

Figure 3:
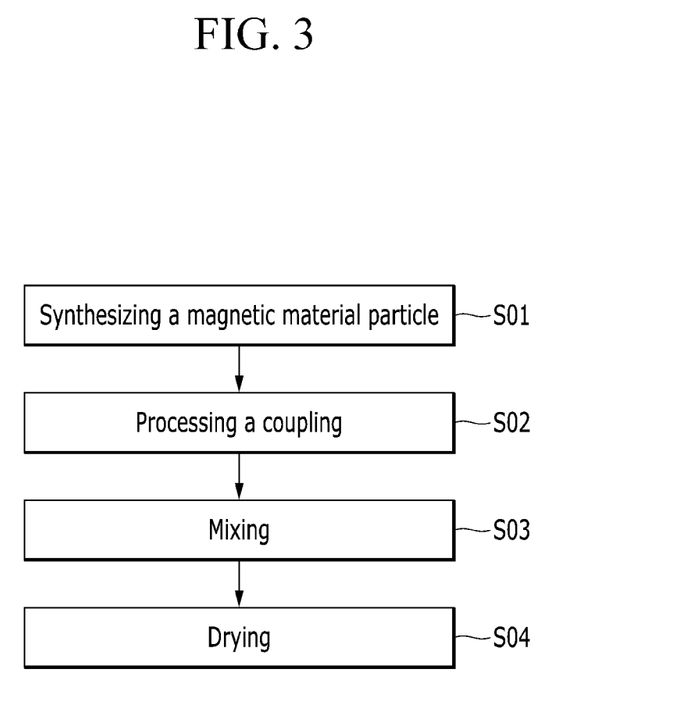
FIG. 3 is a flowchart showing a method for manufacturing a magnetic sheet according to an embodiment.

FIG. 3 is a flowchart showing a method for manufacturing a magnetic sheet according to an embodiment.

Referring to FIG. 3, the manufacturing method of the magnetic sheet 100 according to the embodiment includes the step of synthesizing the magnetic material particle 10 (S01), the step of coupling and processing the magnetic material particle 10 (S02), the step of mixing the synthesized magnetic material particle 10 with a solution comprising the nanofiber 21 (S03), and the step of drying the formed nanofiber matrix 20 and the magnetic material particle 10 (S04).

Before the synthesis of the magnetic material particle 10, an iron (Fe)-containing precursor solution is provided. The precursor solution may be the material in which at least iron (Fe) and a chloride or a nitrogen oxide of each metal including one or more selected from barium (Ba), strontium (Sr), and calcium (Ca) are mixed in the solvent.

Also, in the precursor solution, to form the M-type hexaferrite, the chloride or the nitrogen oxide of one or more among the homogeneous rare earth metal elements such as barium (Ba) or strontium (Sr), or one or more elements selected from Co, Mn, Zn, Zr, Ni, Ti, Cu, Al, Ge, and As, may be additionally further included.

To form the W-type hexaferrite, the chloride or the nitrogen oxide and one or more elements selected from Cu, Zn, Mn, and Ni may be additionally further included in the precursor solution.

As the solvent of the precursor solution, water ($H_2O$), an aqueous alkali solution, or an organic solvent including a $C_1$ to $C_{20}$ alkyl group may be used. In an embodiment, as the solvent of the precursor solution, a 1 molar (M) sodium hydroxide (NaOH) aqueous solution may be used to form the precursor solution, however it is not limited thereto.

The iron ion and the ion of the added metal are ionized in the precursor solution. In the precursor solution, the weight ratio of the iron ion and the ion of the added metal may be variously controlled, for example, to form the M-type hexaferrite, the weight ratio of the iron ion and the ion of the added metal may be controlled to 8:1.

Further, the concentration of the iron ion in the precursor solution may be variously controlled depending on the kind of the hexaferrite to be formed, and for example, to less than 10 millimoles (mmol), for example, less than 5 mmol, or for example, 1.5 mmol.

Figure 4:
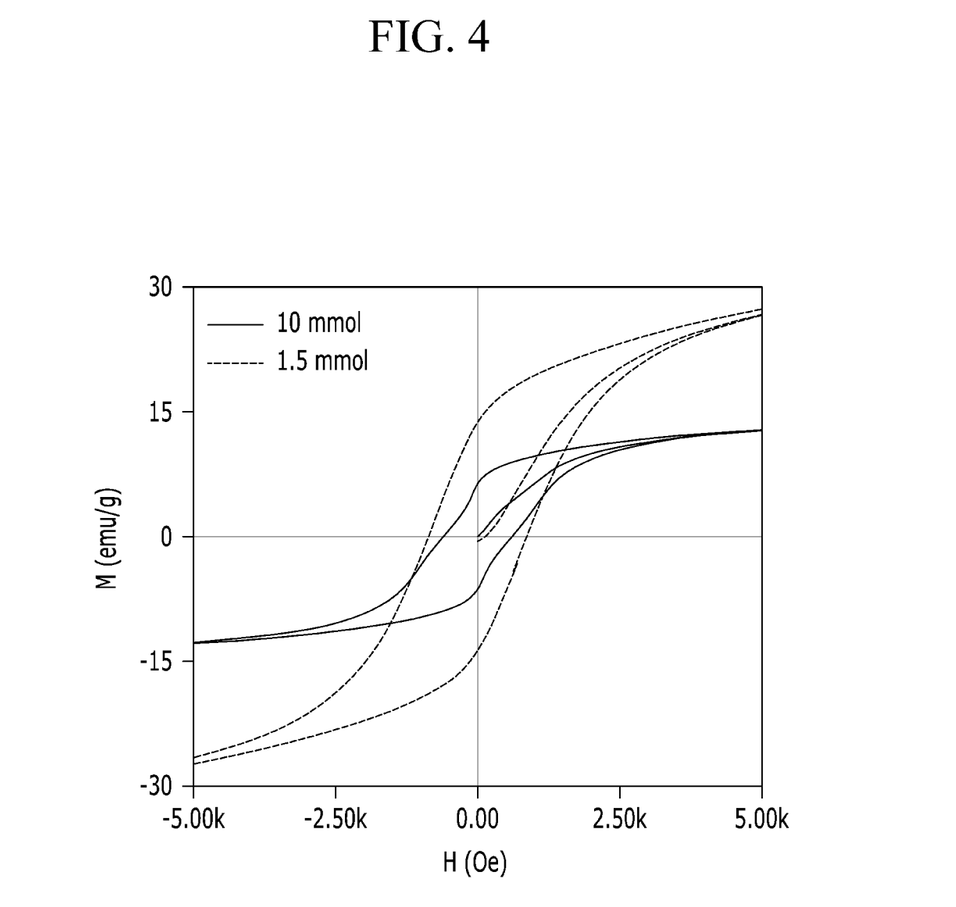
FIG. 4 is the plot of the M-H curve of a magnetic characteristic of a magnetic material particle manufactured using a precursor solution having an FeCl₃ concentration according to an embodiment.

FIG. 4 is a plot of the total magnetization versus applied magnetic field (M-H curve) of a magnetic material particle manufactured using precursor solution having differing $FeCl_3$ concentrations. The magnetic saturation and the coercive force in 50 kiloOersted (kOe) for each case are shown in Table 1 below. In Table 1, in both cases, in the total volume 30 ml of the precursor solution, ferrous trichloride (FeCl3) and barium dichloride (BaCl2) are mixed at an 8:1 weight ratio.

TABLE 1

| Synthesis condition | In 50 kOe, magnetic saturation | Coercive force |
| --- | --- | --- |
| $FeCl_3$ = 1.5 mmol | 40.23 emu/g | 850 Oe |
| $FeCl_3$ = 10 mmol | 18.78 emu/g | 600 Oe |

The iron and the added metal chloride may be present in a relatively high concentration in the precursor. The size of the formed hexaferrite particles is shown to increase with relatively low concentration. As shown in FIG. 4, compared with the case of the ferrous trichloride ($FeCl_3$) at 10 mmol, the case of the ferrous trichloride ($FeCl_3$) at 1.5 mmol shows greater magnetic saturation and coercive force of the magnetic material particle 10.

That is, in an embodiment, the concentration of the iron ion in the precursor solution may be controlled within the above range and the magnetic material particle 10 having excellent magnetic characteristic may be manufactured.

In the step of synthesizing the magnetic material particle (S01), the iron containing precursor solution is synthesized. In an embodiment, the magnetic material particle 10 may be synthesized through the solvothermal synthesis. That is, the precursor solution is inserted into an oven to be heated to a predetermined temperature. Accordingly, all the solvent in the precursor solution is evaporated and the iron ion and the added metal ion in the precursor solution are bonded, thereby obtaining the hexaferrite powder represented by Chemical Formula 1 or Chemical Formula 2. The obtained hexaferrite powder, as shown in FIG. 1, is a group of particulates having the hexagonal structure on the plane.

In the step of synthesizing the magnetic material particle (S01), the solvothermal synthesis may be performed at a temperature condition of 200° C. to 400° C., for example, 200° C. to 300° C., or for example, 200° C. to 260° C.

Figure 5:
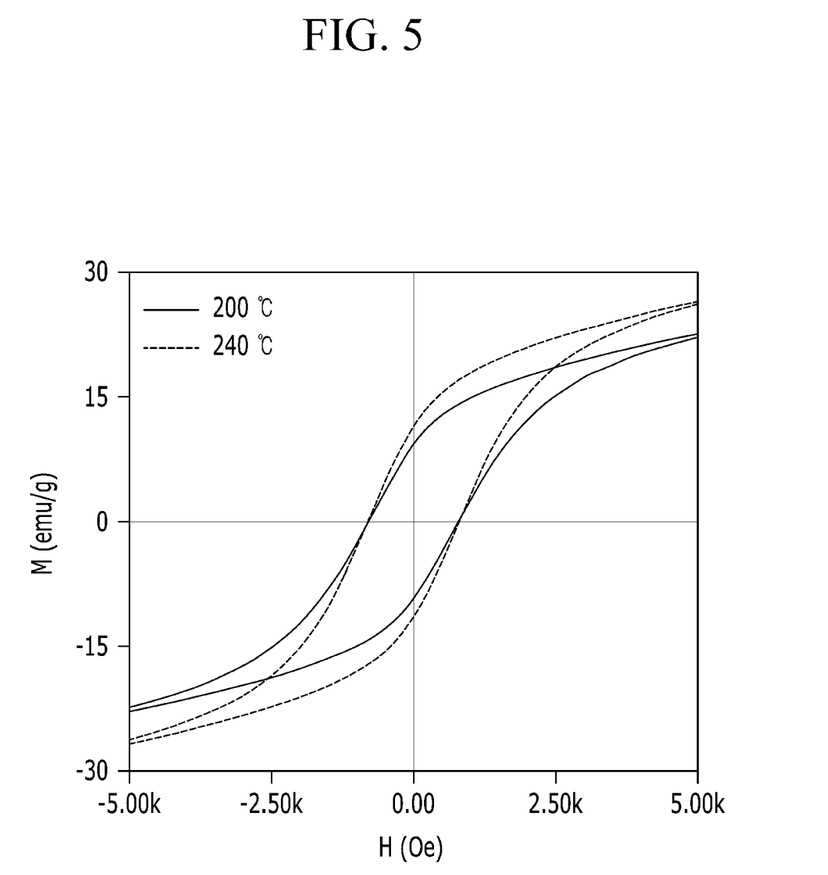
FIG. 5 is the plot of an M-H curve of a magnetic characteristic of a magnetic material particle manufactured at a synthesis temperature according to an embodiment.

FIG. 5 shows an M-H curve of a magnetic material particle manufactured using a synthesis temperature as shown in the figure. The magnetic saturation and the coercive force at 10 kOe for each case are shown in Table 2 below. In FIG. 5 and Table 2, the condition of the ferrous trichloride ($FeCl_3$) is the same as the condition of the case of 1.5 mmol in Table 1, and the synthesizing time is the same at 18 h.

TABLE 2

| Synthesis temperature | At 10 kOe, magnetic saturation | Coercive force |
| --- | --- | --- |
| 200° C. | 27.84 emu/g | 780 Oe |
| 240° C. | 32.84 emu/g | 800 Oe |

When the synthesis temperature is a relatively high temperature, the reaction between the iron ion and the other added metal ion in the precursor is promoted, and the size of the hexaferrite particles increases compared with synthesis at a relatively low temperature. For example, as shown in FIG. 5 and Table 2, when performing the synthesis at the temperature of 240° C., compared with the case of performing the synthesis at the temperature of 200° C., the magnetic characteristic (the magnetic saturation and the coercive force) of the manufactured magnetic material particle 10 is improved.

That is, in an embodiment, in the synthesis process of the magnetic material particle 10, when the synthesis temperature is controlled within the above range, a magnetic material particle 10 having the excellent magnetic characteristic may be manufactured.

On the other hand, if the synthesis of the magnetic material particle 10 is completed, the synthesized magnetic material particle 10 may be subjected to cleaning and a subsequent heat treatment. For example, the magnetic material particle 10 may be cleaned several times by using DI water, and to remove the moisture from the cleaned magnetic material particle 10, the heat treatment may be performed for 18 h at 200° C.

However, the synthesis of the magnetic material particle (S01) is not limited to this method, and the iron-containing material and the other added metal material may be mixed and sintered at a very high temperature, for example more than 1000° C., to obtain a hexaferrite powder.

In the coupling processing step (S02), the coupling material 30 is introduced to the synthesized magnetic material particle 10 to chemically bond the magnetic material particle 10 to the coupling material 30. The coupling material 30 used in the embodiment may be the above-described silane compound, and the magnetic material particle 10 may form the hydrogen bond or the covalent bond with the coupling material 30. When the coupling processing is completed, a magnetic material particle containing solution in which the magnetic material particle 10 is chemically bonded to the coupling material 30 is obtained.

In the mixing step (S03), the process of mixing the solution containing the coupling processed magnetic material particle with the nanofiber containing solution is performed. In an exemplary embodiment, the nanofiber may be the cellulose fiber that is available by a known method as described above, and the nanofiber containing solution may be a cellulose fiber solution.

In the mixing step, the coupling processed magnetic material particle containing solution may form chemical bonding with the hydroxyl group (—OH) of the nanofiber 21 surface such as the above-described hydrogen bonding or covalent bonding. Accordingly, the magnetic material particle 10 may be strongly bonded to the nanofiber 21 surface through the coupling material 30.

On the other hand, in the mixing step (S03), the amounts of magnetic material particle containing solution may be variously controlled. It may be introduced in amounts of 1 milliliter (ml) or more, for example in amounts of 3 ml or more.

Figure 6:
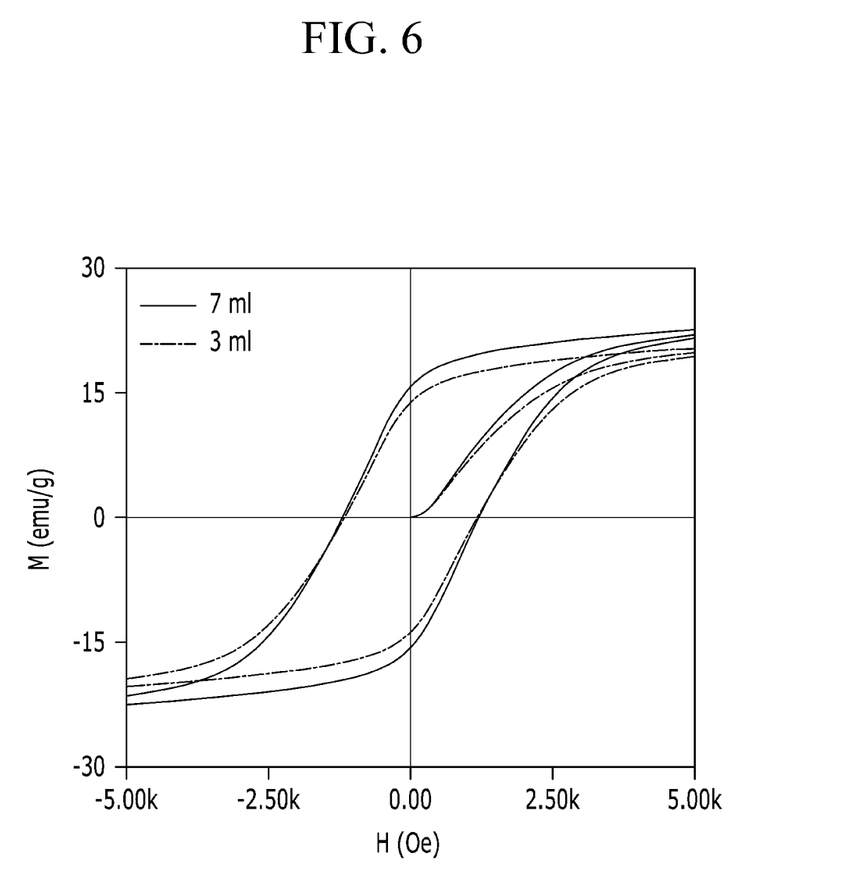
FIG. 6 is the plot of an M-H curve of a magnetic characteristic of a magnetic sheet manufactured using differing amounts of solution containing a magnetic material particle according to an embodiment.

FIG. 6 is an M-H curve of a magnetic sheet manufactured using the cited amount of a solution containing a magnetic material particle according to an embodiment. The weight of the magnetic material particle, the weight of the magnetic sheet, and the magnetic saturation for each case depicted in FIG. 6 are shown in Table 3.

TABLE 3

| Magnetic material particle containing solution introduced amount | Magnetic material particle weight | Magnetic sheet weight | Magnetic saturation |
|---|---|---|---|
| 3 ml | 34.6 mg | 134.6 mg | 14.75 emu/g |
| 7 ml | 66 mg | 166 mg | 16.14 emu/g |

As the amount of introduced magnetic material particle containing solution is increased, the amount of the contained magnetic material particle is increased proportional thereto such that the magnetic saturation of the magnetic sheet is proportional to the introduced amount of the magnetic material particle containing solution. For example, as shown in FIG. 6 and Table 3, when introducing 7 ml of the magnetic material particle containing solution, compared with the case of introducing 3 ml of the magnetic material particle containing solution, the magnetic saturation is increased since the absolute amount of the magnetic material particle is increased and the magnetic characteristic of the magnetic material shows the further excellent trend.

That is, in an embodiment, by controlling the introduction of the magnetic material particle containing solution to the above range, the magnetic sheet having the excellent magnetic characteristic may be manufactured.

Further, if the mixture of the magnetic material particle containing solution and the nanofiber containing solution is completed, a process removing the water of the solvent from the mixture solution is undergone. In an embodiment, the water of the solvent may be rapidly removed from the mixture solution by using a vacuum filtration method. The magnetic material particle 10 and the nanofiber 21 are not removed by filtration. In this case, the magnetic material particle 10 is bonded to the nanofiber surface 21 through the coupling material 30, and two or more nanofibers 21 are entangled with each other, thereby forming the nanofiber matrix 20. However, since a small amount of the water remains after filtration, the bonding force between two or more nanofibers 21 is weak.

Next, in the drying step (S04), the process of drying two or more nanofibers 21 having the shape of the filtered nanofiber matrix 20 and the magnetic material particle 10 attached to the nanofiber 21 is executed. In an exemplary embodiment, as a gas having chemical stability, an inert gas such as argon (Ar), helium (He), neon (Ne), or nitrogen ($N_2$) may be sprayed to dry the small amount of the remaining moisture therein.

In general, since the nanofiber 21 includes the hydroxyl group (—OH) of the hydrophilic group, the remaining moisture may not all be dried, but may remain such that the mechanical characteristics of the nanofiber matrix 20 may be deteriorated. However, in the embodiment, since the surface of the nanofiber 21 is enclosed by the coupling material 30 and the surface of the magnetic material particle 10, the remaining moisture may be dried.

Further, the coupling material 30 encloses the surface of the nanofiber 21 to be protected such that the external moisture may be prevented from penetrating into the nanofiber 21. That is, according to an embodiment, the magnetic sheet 100 with improved water vapor permeability may be provided.

Meanwhile, in an embodiment, in the drying step, the nanofiber matrix 20 and the magnetic material particle 10 may be pressed at a predetermined pressure. In the drying step (S04), the order of the pressure process is not particularly limited thereto, and the pressure may be simultaneously applied with the spray of the gas, may be applied after completion of the spray of the gas, or may be applied while the spray of the gas is stopped.

In an embodiment, the nanofiber matrix 20 and the magnetic material particle 10 may be pressed at a pressure of 20 MPa or more, for example, 30 MPa or more, or for example, 40 MPa or more. Also, in an embodiment, the nanofiber matrix 20 and the magnetic material particle 10 may be pressed at a pressure of 100 MPa or less, for example, 80 MPa or less, for example, 60 MPa or less, or for example, 50 MPa or less.

If the nanofiber matrix includes two or more pores and the magnetic material particle is attached to the nanofiber matrix through the coupling material, the space between two or more nanofibers is extended compared with the case only forming the nanofiber matrix. That is, the magnetic sheet made of the nanofiber matrix and the magnetic material particle has a high density of pores such that the mechanical characteristic may be weak.

Also, it may be difficult to apply the magnetic sheet made of the magnetic material particle and the nanofiber matrix to an environment in which the repeated mechanical impact is applied, for example, a vibration plate of a speaker 1000.

However, in an embodiment, in the drying step (S04), the nanofiber matrix 20 and the magnetic material particle 10 are pressed by the predetermined pressure such that the density of the part inside the nanofiber matrix 20 is reduced and compressed, thereby providing the magnetic sheet 10 of which the mechanical characteristic is recovered.

The tensile strength of the magnetic sheet manufactured by pressing the nanofiber matrix and the magnetic material particle for 10 min at 120° C. at 20 MPa, the magnetic sheet manufactured by pressing them at 40 MPa at 120° C., and the tensile strength of the cellulose nanofiber sheet manufactured by a general method are shown in Table 4 below. In Table 4, after the tensile strength of each sheet was tested by using a universal testing machine of Lloyd Instruments Ltd. and ultimate tensile strength is recorded.

TABLE 4

| Kind | Tensile strength |
|---|---|
| General cellulose nanofiber sheet | 62 MPa |
| Magnetic sheet pressed at 20 MPa | 44 MPa |
| Magnetic sheet pressed at 40 MPa | 60 MPa |

Referring to Table 4, the tensile strength of about 62 MPa is shown for the general nanofiber sheet, however the tensile strength of about 44 MPa is shown for the magnetic sheet pressed at 20 MPa, a reduction of 71%. However, it may be confirmed that the tensile strength of about 60 MPa that is about 97% of the general nanofiber sheet is shown for the magnetic sheet pressed at 40 MPa, maintaining 97% of the tensile strength of the general cellulose nanofiber sheet. That is, in the drying step (S04), by reducing the pore density inside the nanofiber matrix by pressing the magnetic sheet by the predetermined pressure, it may be confirmed that the mechanical characteristic of the magnetic sheet is recovered.

Figure 7:
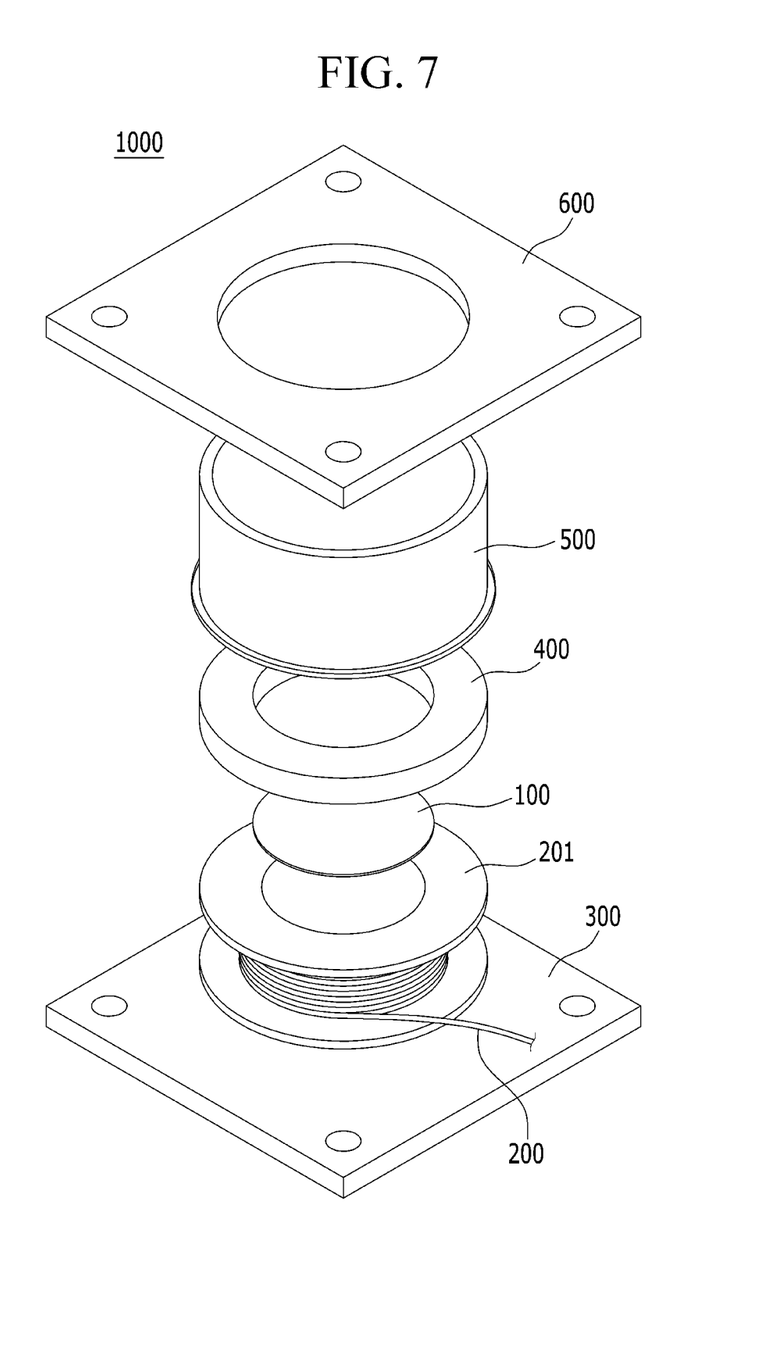
FIG. 7 is a view showing a speaker including the magnetic sheet of FIG. 1.

Now, the configuration of the speaker 1000 including the above-described magnetic sheet 100 will be described.

FIG. 7 is a view showing a speaker including the magnetic sheet of FIG. 1.

Referring to FIG. 7, the speaker 1000 includes the above-described magnetic sheet 100, a coil 200 disposed under the magnetic sheet 100, a reel-type structure 201 rolled with the coil 200, a lower cover 300 disposed under the reel-type structure 201, and a first frame 400, a second frame 500, and an upper cover 600 sequentially disposed on the magnetic sheet 100.

The coil 200 is controlled to flow a variable AC current, and as the variable AC current is applied, a variable magnetic field is formed around the coil 200. The scale and the direction of the magnetic field may be variously changed according to the change of the AC current.

The magnetic sheet 100 is magnetized by the influence of the magnetic field formed by the coil 200, and as the direction of the magnetic field is changed, an attraction force in the direction toward the coil 200 and a repulsive force of the direction away from the coil 200 may be applied.

That is, while the magnetic sheet 100 is mechanically vibrated by the attraction force and the repulsive force, the air is vibrated. The first frame 400, the second frame 500, and the upper cover 600 are respectively formed with a hole on the center parts and are connected to each other, and the air vibrated from the magnetic sheet 100 may be discharged to the outside of the upper cover 600 through the hole.

The cross-sectional shape of the hole formed in the first frame 400, the second frame 500, and the upper cover 600 may be variously formed such as circular, oval, polygonal, or non-determined, however it may be formed with the cross-sectional shape corresponding to the magnetic sheet 100 like the embodiment.

In general, the speaker has a structure including a coil flowing the variable current and integrated with a vibration plate and a permanent magnet magnetized by the variable magnetic field of the coil and disposed under the coil. In a general structure of a speaker, a permanent magnet with the hard magnetic material occupies a significant volume such that the volume is very large and it is heavy.

However, the speaker 1000 as described herein may simultaneously execute the functions of the vibration plate and the permanent magnet through the magnetic sheet 100 having the excellent magnetism as the hard magnetic material, thereby being widely utilized with various usages at various positions such as small electronic devices, vehicles, or buildings. That is, according to the embodiment, a low-weight and down-sized speaker 1000 may be provided.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A magnetic sheet comprising:
   a magnetic material particle comprising a hexaferrite;
   a nanofiber matrix comprising two or more nanofibers; and
   a coupling material chemically coupled with each of the magnetic material particle and the nanofiber matrix,
   wherein the magnetic material particle satisfies Chemical Formula 1 or Chemical Formula 2:

$A_{1-x}R_xFe_{12-y}M_yO_{19}$      Chemical Formula 1

$AQ_2Fe_{16}O_{27}$      Chemical Formula 2 wherein, in Chemical Formula 1, A is one or more elements selected from Sr, Ba, and Ca, R is one or more elements selected from rare earth elements, M is one or more elements selected from Co, Mn, Zn, Zr, Ni, Ti, Cu, Al, Ge, and As, $0 \le x \le 0.6$, and $0 \le y \le 1.2$,
   wherein, in Chemical Formula 2, A is one or more elements selected from Sr, Ba, and Ca, and Q is one or more elements selected from Cu, Zn, Mn, and Ni,
   wherein the nanofiber matrix coupled to the magnetic material particle is pressed at a pressure of 20 MPa to 80 MPa, such that the tensile strength of the magnetic sheet is about equal to the tensile strength of a substantially identical sheet without the magnetic material and coupling material.

2. The magnetic sheet of claim 1, wherein the magnetic material particle comprises at least one of an M-type hexaferrite and a W-type hexaferrite.

3. The magnetic sheet of claim 1, wherein the magnetic material particle is a hard magnetic material.

4. The magnetic sheet of claim 1, wherein the magnetic material particle is present in an amount of 5 wt % or more with reference to an entire weight of the magnetic sheet.

5. The magnetic sheet of claim 1, wherein a size of the magnetic material particle is more than 0 μm to less than 50 μm.

6. The magnetic sheet of claim 1, wherein a diameter of each nanofiber of the two or more nanofibers is in a range of 5 nm to 100 nm.

7. The magnetic sheet of claim 1, wherein each nanofiber of the two or more nanofibers comprises a cellulose nanofiber.

8. The magnetic sheet of claim 1, wherein the coupling material is a silane compound comprising a hydrophilic group.

9. The magnetic sheet of claim 8, wherein the silane compound comprises repeating units derived from a monomer represented by Chemical Formula 3:

Chemical Formula 3

10. The magnetic sheet of claim 1, wherein
the coupling material comprises at least an amine functional group.

11. The magnetic sheet of claim 1, wherein the magnetic material particle and the coupling material are bonded by a covalent bond or a hydrogen bond.

12. The magnetic sheet of claim 11, wherein the covalent bond includes an ether bond (—O—).

13. A speaker comprising:
a reel-type structure which is rolled with a coil;
the magnetic sheet of claim 1, the magnetic sheet disposed on the reel-type structure;
a first frame disposed on the magnetic sheet; and
a second frame disposed on the first frame.

14. A method for manufacturing the magnetic sheet of claim 1, comprising:
synthesizing the magnetic material particle;
mixing the magnetic material particle with a solution comprising a nanofiber to form a nanofiber matrix; and
drying the formed nanofiber matrix and the magnetic material particle.

15. The method of claim 14, wherein
synthesizing the magnetic material particle comprises solvothermal synthesis.

16. The method of claim 15, wherein
the solvothermal synthesis is performed at a temperature of 200° C. to 400° C.

17. The method of claim 14, further comprising
processing coupling of the synthesized magnetic material particle.

18. The method of claim 14, wherein
the nanofiber matrix and the magnetic material particle are pressed during drying.

* * * * *